United States Patent [19]
Kaniuka

[11] 3,765,624
[45] Oct. 16, 1973

[54] FLUIDICALLY AUGMENTED VARIABLE GAIN ARTIFICIAL FEEL SYSTEM

[75] Inventor: Walter W. Kaniuka, Philadelphia, Pa.

[73] Assignee: The United States of America as represented by the Secretary of the Navy, Washington, D.C.

[22] Filed: Sept. 29, 1971

[21] Appl. No.: 184,734

[52] U.S. Cl. .............................................. 244/83 R
[51] Int. Cl. ........................................... B64c 13/36
[58] Field of Search ................. 244/75 R, 75 A, 76, 244/77, 78, 79–82, 83, 84–85; 35/12; 235/200 PF

[56] References Cited
UNITED STATES PATENTS
3,489,379  1/1970  Bogart................................ 244/83 R
3,478,990  11/1969  Kaniuka............................. 244/83 R
3,237,107  2/1966  Bresenoff et al................... 244/77 D Primary Examiner—Milton Buchler
Assistant Examiner—Jesus D. Sotelo
Attorney—R. S. Sciascia et al.

[57] ABSTRACT

A fluidic artifical feel system responsive to the rotational and vertical accelerations and the speed of an aircraft along its flight path, including fluidic angular and vertical accelerators, an air data sensor and fluidic variable gain amplifiers gain modulated according to the signal received from the air data sensor. The accelerometers and the air data sensor are connected through respective variable gain amplifiers to a summing amplifier, the output signal thereof being connected to a fluidic valve which provides a pressure differential across a piston connected to the control stick of the aircraft.

10 Claims, 5 Drawing Figures

INVENTOR.
WALTER W. KANIUKA
ATTORNEY

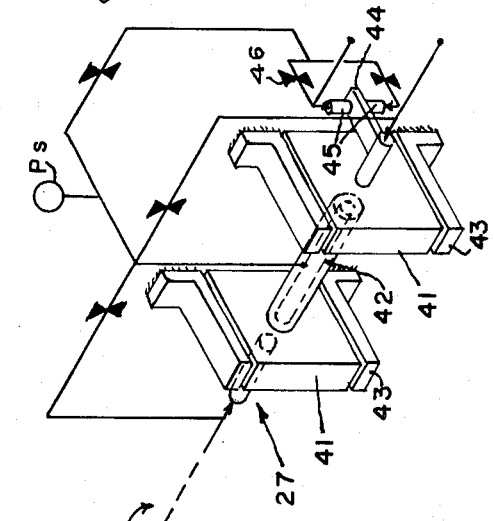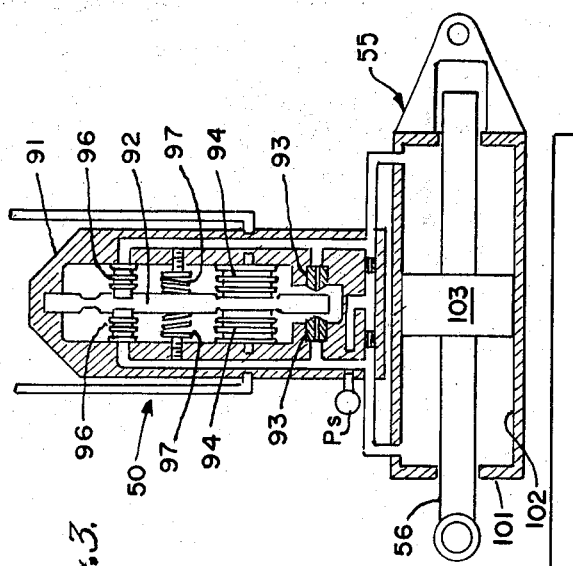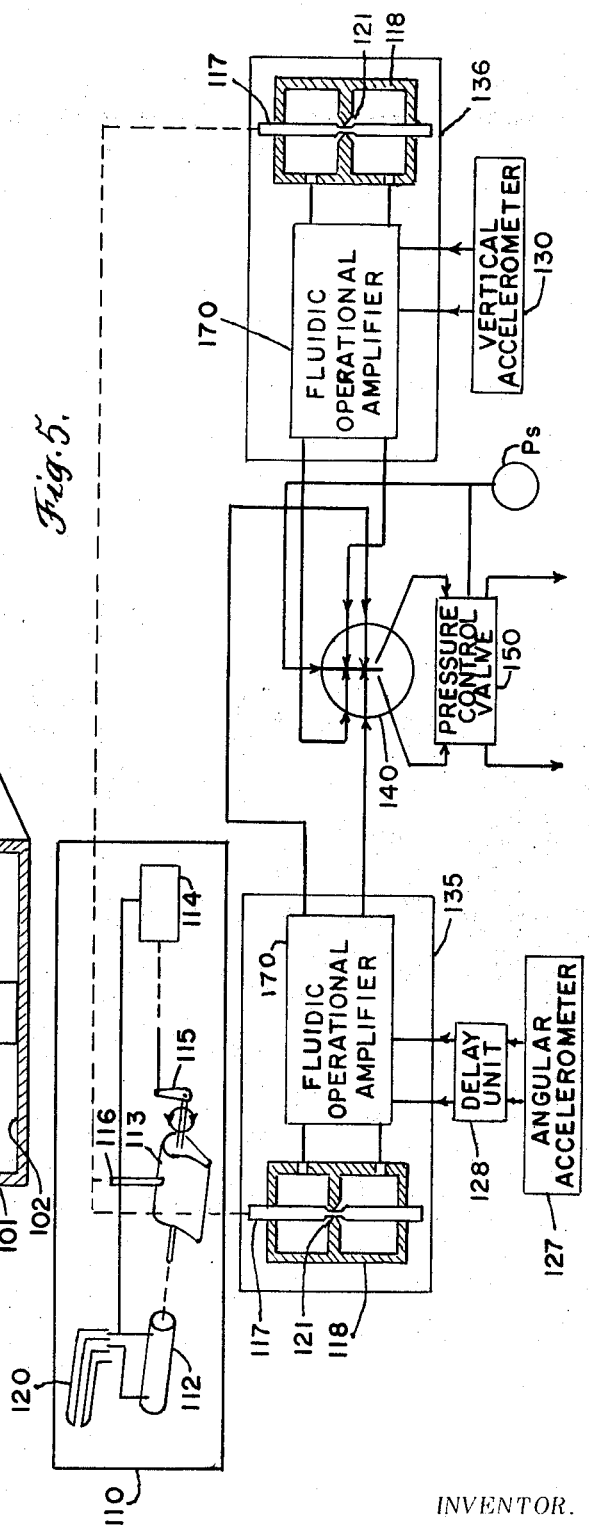

FLUIDICALLY AUGMENTED VARIABLE GAIN ARTIFICIAL FEEL SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to flight control apparatus, and more particularly to aircraft control stick artificial feel apparatus.

The general subject of stick response qualities is a subject of considerable concern to those in the art of manned aircraft. It is a particularly significant subject in the development of aircraft where pilot handling and maneuverability is a primary design object. Generally, as broader flight regimes are provided for in the aircraft the typical pilot's ability to adapt to the varying responses to control stick deflections is recognized to be marginal. More specifically where the aircraft control surfaces are fully powered offering no apparent resistance under all flight conditions, or where the force feedback through the control stick goes through unexpected changes as a result of changing flight conditions, such as control force reversals often caused by entering the transonic flight regime, an artificial force feel system is necessary in order to predictably inform the pilot, through his hand, of the aerodynamic hinge moment on the control surfaces and the aircraft response thereto. It is furthermore necessary to provide in the artificial feel system force levels which effectively preclude the pilot from positioning the control surfaces in a potentially destructure attitude where such destructive attitude varies with flight conditions. Accordingly, various systems have been devised in the past for providing an artifical force feel to control stick on an aircraft. Generally, in the past such systems were either mechanical, the so-called springbobweight systems, or hydraulic, or a combination of both. Both kinds of systems involved weight penalties either due to the mass of the bobweights or due to required hydraulic volumes stored in accumulators to accommodate stick motion. Furthermore, the typical prior art artificial feel control systems functioned on the basis of stick displacement from a fixed reference position and complex arrangements of components were necessary to bias the stick displacement necessary for the trimming of the aircraft. Thus, large efforts have been expended in the prior art to reduce the complexity and weight of the artificial feel systems.

SUMMARY OF THE INVENTION

Accordingly, it is the general purpose and object of the present invention to provide an artificial feel system which is independent of the trim position of the control stick for generating resistive forces to the displacement of the control stick from trim, such forces being functionally dependent on the flight conditions of the aircraft. Other objects of the invention are to provide, through gain shaping, limiting stick forces such that stick motion will be force limited and destructive control surface deflections are prevented.

Briefly these and other objects are accomplished within the present invention by providing an artificial feel system including angular and normal fluidic accelerometers for registering the angular and normal accelerations of the aircraft, and air data sensors registering the static and total pressure head on the aircraft or the Mach number. A plurality of variable gain fluidic amplifiers receive the fluidic signals from the normal and angular accelerometers and amplify said signals according to predetermined functions of the total and static pressures or the Mach number from the air data sensors. A fluidic summing amplifier receives the amplified normal and angular accelerations, the output thereof being connected to a pressure control valve which provides a force feedback to the control stick. Also connected to the control stick are a spring and a damper together with a single bobweight for augmenting the fluidic artificial feel system and providing a backup in case of failure of any of the components thereof.

BRIEF DESCRIPTION OF THE DRAWING

FIG. 3 is a cross-sectional view of a pressure control valve together with a force producer of FIG. 1;

FIG. 4 is a schematic of an angular accelerometer of FIG. 1; and

FIG. 5 is a schematic of another embodiment of the artificial feel system according to the present invention.

DESCRIPTION OF THE PREFERRED EMBODIMENTS

Figure 1:
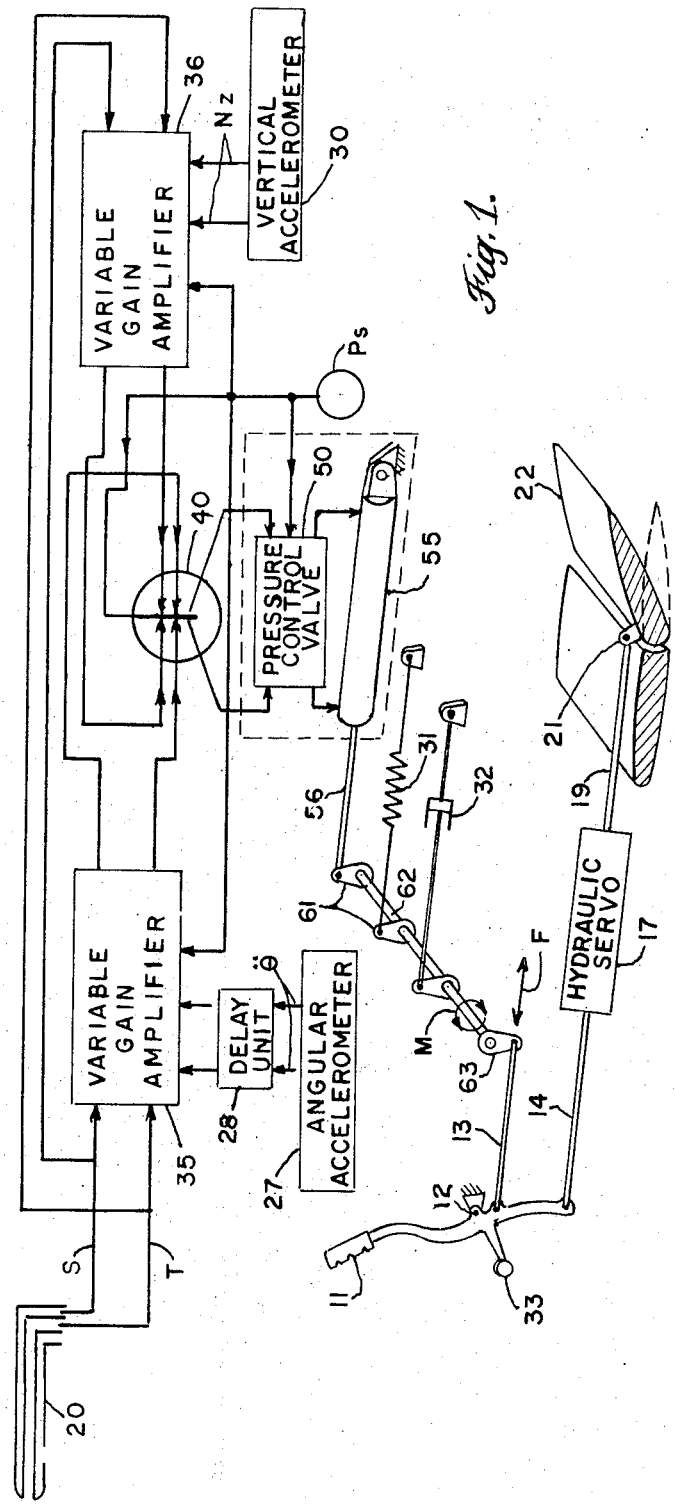
FIG. 1 is a schematic of one embodiment of an artificial feel system constructed according to the present invention.

Shown in FIG. 1 is an artificial feel system generally adapted for subsonic aircraft where control reversal and other Mach number effects are not encountered.

A typical aircraft control stick 11 is connected across a pivot 12 to two control rods 13 and 14. Rod 14 provides the stick actuation input to a hydraulic servo 17 which at the output side is connected by rod 19 to a control horn 21 on a conventional aerodynamic control surface 22. Servo 17 together with control surface 22 form a typical aircraft control system and for purposes of further description reference will be made to the longitudinal or pitch control system. Specifically in a conventional configuration control surface 22 represents an elevator and as such it is subject to both the angular or pitch accelerations as well as vertical accelerations of the aircraft. Both modes of acceleration produce hinge moments around the hinge line of control surface 22, caused by the combination of the center of mass or inertia offset of the control surface 22 from the hinge line and aerodynamic effects which are a function of the speed of the aircraft. Characteristically servo 17 does not provide any significant force feedback to the stick 11. Such force feedback is provided through rod 13 in a manner described below.

An air data sensor, such as a conventional pitot tube 20, registers both the static and total pressures in a conventional manner, providing fluidic signals S and T respectively indicative of the magnitudes thereof. An angular accelerometer 27 provides a fluidic signal $\ddot{\theta}$ carried as a pressure differential signal across two lines. Signal $\ddot{\theta}$ indicates the angular acceleration of the aircraft in the pitch plane being generated within accelerometer 27 by means further described hereinbelow. The vertical accelerations of the aircraft are registered by a fluidic vertical accelerometer 30 of a type well known in the art, transmitting a pressure differential signal $N_z$ on two lines indicative of the vertical accelerations.

Signals S and T are respectively connected to the gain modulation input sides of fluidic variable gain amplifiers 35 and 36 for producing gain changes corresponding to the pressure differential between signals S and T as described hereinbelow. Also connected to amplifier 35 is the output signal of a conventional fluidic delay unit 28 which receives at the input side signal $\ddot{\theta}$ from accelerometer 27 which is further described hereinbelow. Delay unit 28 provides a predetermined lag to signal $\ddot{\theta}$ simulating the cross product of the aircraft angular rate and flight velocity. The output signal $N_z$ of the vertical accelerometer 30 is directly connected to the input side of amplifier 36 where it is gain modulated by the dynamic pressure or the pressure differential between signals S and T. The output signals of amplifiers 35 and 36 are connected to a fluidic single stage summing amplifier 40. Summing amplifier 40 provides a paired output signal to the input side of a pressure control valve 50. Valve 50 generates a paired fluidic output signal connected to a force producer 55 which is pivotally affixed at one end. A connecting rod 56 slidably extends from the other end of force producer 55 being pivotally connected to the free end of a bell crank 61 which is resolved into a torque M by means described hereinbelow. Torque M is in turn converted back into a force F through another bell crank 63 mounted on tube 62 which is connected to the other end of rod 13. In this manner a resistive force is generated at the stick 11 which corresponds to a predetermined combination of pitch acceleration, vertical acceleration and dynamic pressure in order to inform the pilot through the stick of the aircraft response to a control deflection.

A pressure source $P_s$, which can be either a compressed air source or a bleed from the compressor stage of a jet engine, or a source of any other compressed gas, is commonly connected to amplifiers 35, 36 and 40 and the pressure control valve 50.

Also connected to torque tube 62 is a conventional spring 31 and a damper 32 which, together with a bobweight 33 mounted on stick 11, form a conventional stick feel system, both augmenting the fluidic artificial feel system and providing a backup in case of failure.

Figure 2:
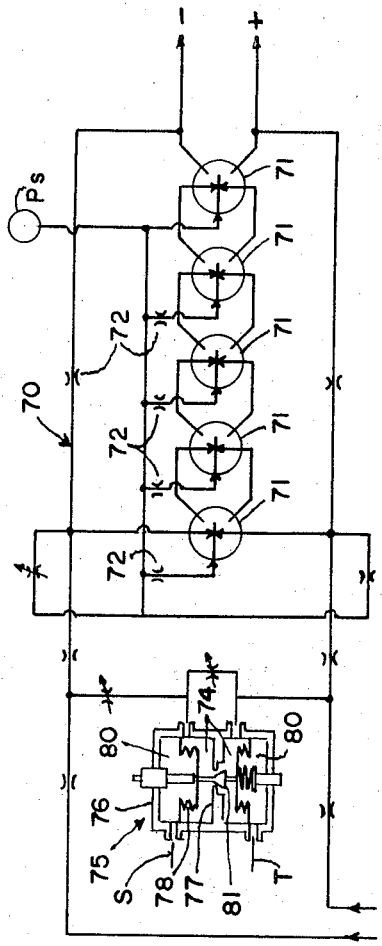
FIG. 2 is a detailed schematic of a variable gain amplifier of FIG. 1.

As shown in more detail in FIG. 2 amplifiers 35 and 36 each include a fluidic multiple stage operational amplifier 70 comprising a plurality of series connected high gain stages 71 wherein the output signal of the last stage is fed back to sum with the input signal as conventionally practiced in operational amplifiers. A plurality of preselected orifices 72 is provided on respective signals for producing effective resistances to the flow and thereby adjusting the individual gains of the stages and the overall gain of amplifier 70. At the input side of amplifier 70 a variable orifice shunt unit 75 responsive to the pressure differential between signals S and T forms a gain modulation circuit. Shunt unit 75 comprises a housing 76 separated into two cavities by an orificed wall 77 wherein each cavity is further divided into two chambers 74 and 80 by a bellows 78 forming two chambers 74 joined by the orifice in wall 77 and two chambers 80 respectively connected to receive pressure signals S and T. Bellows 78 are disposed within each cavity in opposing relationship having attached thereto a shaped conical member 81 extending through the orifice in wall 77. Accordingly, a variable orifice is formed responsive to the pressure differential between signals S and T. Chambers 74 are respectively connected across the paired input signal, which can be either signal $N_z$ or the delay unit 28 output signal, thereby forming a variable orifice shunt across the respective signals. Thus the variable orifice shunt produces the desired effect of modulating the gain of amplifiers 35 and 36 in response to changes in dynamic pressure.

As shown in FIG. 3 the output signal of summing amplifier 40 is connected to the input side of pressure control valve 50. Pressure control valve 50 comprises a hollow housing 91 having affixed at one inside surface thereof one end of a flapper 92. Flapper 92 is free to flex between two opposing orifices 93 proximate the free end thereof whereby the flow path through orifices 93 is correspondingly restricted on one side and opened on the other side of flapper 92. The deflection of the flapper is controlled by two opposing bellows 94 disposed in abutting relationship on either side of flapper 92 where bellows 94 are connected to receive the respective connectors carrying the output signal from summing amplifier 40. Accordingly flapper 92 is displaced or flexed from its normal position intermediate the orifices 93 in response to the output signal from amplifier 40. Orifices 93 form a pressure divider shunt across the distal ends of a tee connection wherein the center leg of the tee connection is connected to pressure source $P_s$ and the distal legs are provided with restrictive orifices. By this arrangement an effective pressure divider is formed responsive to amplifier 40 output signal, dividing the pressure of the pressure source $P_s$ and thereby forming a pressure differential signal. The pressure differential signal is fed back, at a relatively low effective gain, to a second pair of opposing bellows 96 adjacent the fixed end of flapper 92. The lengthwise flexure properties of flapper 92 and the location of bellows 96 and 94 determine both the forward and feedback gains of pressure control valve 50. Also included in control valve 50 are a pair of opposing springs 97 on either side of the flapper, wherein screw adjustment of the spring tension allows for adjustment and trim such that manufacturing tolerances and various system inequalities can be biased out.

The pressure differential output signal from control valve 50 is connected to force producer 55 by a pair of conduits connected to the opposite ends of a cylindrical hollow housing 101. Housing 101 forms a cylindrical bore 102 slidably containing a piston 103 dividing the bore into two chambers, each chamber being respectively connected to one of the conduits from valve 50 such that a pressure differential is provided across piston 103. Attached to the piston 103 is rod 56 slidably extending through one end of the housing 101 to connect with bell crank 61. In this manner the pressure differential signal generated by valve 50 is converted into a resistive force on stick 11.

As shown in FIG. 4 the angular accelerometer 27 comprises rectangular sensing mass units 41, mounted on an air or fluidic bearing 42 and restrained from rotation by air film in gaps formed by the mass units 41 and damper plates 43 mounted on the supporting structure. Attached to the mass units 41 is a flapper 44 wherein the free end of the flapper is located between two opposing nozzles 45. Each nozzle 45 is connected to receive a fluidic signal from the pressure source $P_s$ dropped through respective limiting orifices 46 where the output signal $\ddot{\theta}$ from accelerometer 27 is picked off immediately upstream of nozzles 45. Angular acceleration of the aircraft in pitch accelerates in rotation the supporting frame which in turn squeezes the air film between mass units 41 and plates 43. This produces a relative displacement of flapper 44 creating an unbalance between nozzles 45 and thereby producing a pressure differential signal $\ddot{\theta}$.

As shown in FIG. 5 another embodiment of the present invention provides stick feel forces which are functionally dependent on the Mach number or flight velocity ratio to the speed of sound at the flight altitude. The air data sensor comprises a Mach number sensor 110 including a pilot tube 120 connected to a linear actuator 112, which can be any conventional actuator responsive to a pressure differential, where the actuator 112 linearly displaces a three-dimensional cam 113 in response to the dynamic pressure. At the same time the static pressure registered by the pitot tube 120, or any other source of atmospheric pressure, is connected to a pressure actuator 114 which, through a bell crank 115, actuates in rotation cam 113 providing the altitude parameter. A cam follower 116 is displaced by the combination of the linear and rotational motion of cam 113. Cam follower 116 is connected to two shaped valve members 117 extending through respective shunt units 118 in variable gain amplifiers 135 and 136 whereby the vertical displacement of cam follower 116 varies an opening formed by an orifice 121 in a wall separating shunt unit 118 into two chambers, having the valve member 117 extending therethrough. Each chamber of the shunt unit 118 is connected to receive the respective sides of the input signal, forming a shunt through orifice 121 across the input signal wherein the shunting orifice is modulated in size according to the Mach number. Accordingly the input signal comprising a signal from a delay unit 128 which is connected to receive a signal from an angular accelerometer 127 is partly shunted on receiving the Mach number signal. The shunted angular accelerometer signal is then connected to an operational amplifier 170 which, at the output side, provides a signal indicative of the angular acceleration at a gain functionally dependent on the Mach number. Similarly a vertical accelerometer 130, registering the vertical accelerations of the aircraft, is amplified by amplifier 136 at a gain determined by the shaping of a valve member 127 displaced according to the Mach number. The output signals of amplifiers 135 and 136 are summed in a summing amplifier 140 and the output thereof is connected to a pressure control valve 150. Pressure control valve 150 provides at the output thereof a pressure differential signal which is converted to a stick force as described herein above In operation the inventive artificial feel system responds both to the angular and vertical accelerations of the aircraft. The intial displacement of the stick 11 is resisted by the spring 31 and the damper 32, however once the aircraft response builds up accelerometers 27 and 30 register accelerations which are converted to a restoring feedback force by force producer 55. Acclerometer 27 registers rotational accelerations which in the case of most conventional aircraft lead the vertical accelerations. Accordingly, in order to preclude a destructive control surface position it is contemplated to provide within the present invention a gain in the amplifier 35 which is greater than the gain of amplifier 36 and by preselecting a gain in amplifier 36 which will produce a stick force of approximately 30 pounds, or greater, at a vertical acceleration level approaching destructive limits at a preselected dynamic pressure. The artificial feel system thus produced is independent of trim position of stick 11 being only dependent on the aircraft motion. In particular the force producer 55 is independent of the position of piston 103 being only dependent on the pressure differential signal from control valve 50.

Some of the many advantages of the present invention should now be readily apparent. The inventive artificial feel system is powered by a source of pressurized gas which is readily available on powered aircraft. Also the inventive feel system can be readily adapted to most aircraft requiring a minimum of modification.

Obviously many modifications and variations of the present invention are possible in the light of the above teachings. It is therefore to be understood that within the scope of the appended claims the invention may be practiced otherwise than as specifically described.

What is claimed is:

1. An aircraft artificial feel system for providing a control stick feel force responsive to the motions of the aircraft, comprising:
   a control stick adapted to be connected to an aerodynamic control surface of the aircraft;
   air data sensing means adapted to be mounted on the aircraft for providing a first output signal indicative of the aerodynamic conditions adjacent to the aircraft;
   angular acceleration sensing means adapted to be affixed to the aircraft for providing a second output signal indicative of the angular acceleration of the aircraft;
   linear acceleration sensing means adapted to be affixed to the aircraft for providing a third output signal indicative of the linear acceleration of the aircraft;
   amplifying means operatively connected to receive said first, second and third output signals for producing a fourth output signal indicative of a combination of said second and third output signals at respective gains corresponding to said first output signal, said amplifying means including a first variable gain amplifier operatively connected to receive said first and second output signals indicative of said second output signal at a gain corresponding to a predetermined function of said first output signal, a second variable gain amplifier operatively connected to receive said first and third output signals for producing an output signal indicative of said third output signal at a gain corresponding to a predetermined function of said first output signal, and a summing amplifier connected to receive said first and second variable gain amplifier output signals for producing an output signal indicative of a sum thereof; and
   force producing means operatively connected to said control stick of the aircraft and connected to receive said fourth output signal for producing a resistive force indicative of feel.

2. An artificial feel system according to claim 1, further comprising:
   delay means connected to receive said second output signal for delaying said second output signal a predetermined time interval.

3. An artificial feel system according to claim 2, wherein:

said air data sensing means comprises a pitot tube.

4. An artificial feel system according to claim 3, wherein:

said first, second, third and fourth output signals comprise fluidic pressure differential signals.

5. An artificial feel system according to claim 4, further comprising:

first and second variable gain amplifiers including a shunting unit having two chambers, an orificed wall separating said chambers, bellows sealably mounted across each chamber disposed in opposing relationship and dividing each chamber into subchambers, a conically shaped valve member extending through said orifice and attached at either end to said bellows, first connectors formed in the distal subchambers on the opposite sides of said bellows connected to receive said first sensing means output signals, second connectors formed in the adjacent subchambers intermediate said bellows and on either side of said separating wall respectively connected to receive corresponding ones of said first and second output signals and an operational amplifier connected to said second connectors for providing an output signal indicative of respective ones of said first and second output signals shunted by said shunting unit.

6. An artificial feel system according to claim 5, wherein:

said force producing means comprises a first housing, a flexible flapper attached at one end to said first housing, first opposing bellows abutting said flapper proximate the free end thereof connected to receive said fourth outputt signal, two orifices disposed in opposing relationship on either side of the free end of said flapper, a source of pressure connected in common to said orifices, second opposing bellows disposed in abutting relationship on either side of said flapper and connected to respective ones of said orifices, a second housing forming a cylindrical enclosure connected at the distal ends thereof to respective ones of said orifices, a piston disposed within said housing and a connecting rod attached to said piston and operatively connected to the control stick of the aircraft.

7. An artificial feel system according to claim 2, wherein:

said air data sensing means comprising a pitot tube mounted on the exterior of the aircraft for providing respective output signals indicative of the static and dynamic pressures on the aircraft, a linear actuator connected to receive the pitot tube output signals for providing a linear displacement indicative of the pressure differential between the static and the dynamic pressures, a rotary actuator connected to receive the static pressure for providng an angular displacement output signal indicative of the altitude of the aircraft, a three dimensional cam formed to correspond to the Mach number at preselected altitudes and dynamic pressures, movable in rotation and translation according to the displacement of said linear and rotary actuator means, and a cam follower mounted to contact said cam for providing a linear displacement indicative of the position of the cam.

8. An artificial feel system according to claim 7, wherein:

said second, third and fourth output signals comprise fluidic pressure differential signals.

9. An artificial feel system according to claim 8, further comprising:

said first and second variable gain amplifiers including a shunting unit having two chambers, an orificed wall separating said chambers, a conically shaped valve member extending through said orifice and operatively connected at one end thereof to said cam follower, connectors formed in the respective chambers respectively connected to receive corresponding ones of said first and second output signals and an operational amplifier connected to said connectors for producing an output signal indicative of respective ones of said first and second output signals shunted by said shunting units.

10. An artificial feel system according to claim 9, wherein:

said force producing means comprises a first housing, a flexible flapper attached at one end to said first housing, first opposing bellows abutting said flapper proximate the free end thereof connected to receive said fourth output signal, two orifices disposed in opposing relationship on either side of the free end of said flapper, a source of pressure connected in common to said orifices, second opposing bellows disposed in abutting relationship on either side of said flapper and connected to respective ones of said orifices, a second housing forming a cylindrical enclosure connected at the distal ends thereof to respective ones of said orifices, a piston disposed within said signal housing and a connecting rod attached to said piston and operatively connected to the control stick of the aircraft.

* * * * *